Sept. 3, 1946. M. P. WHITNEY ET AL 2,407,048
ENGINE STARTER DRIVE
Filed Oct. 27, 1944 2 Sheets-Sheet 1
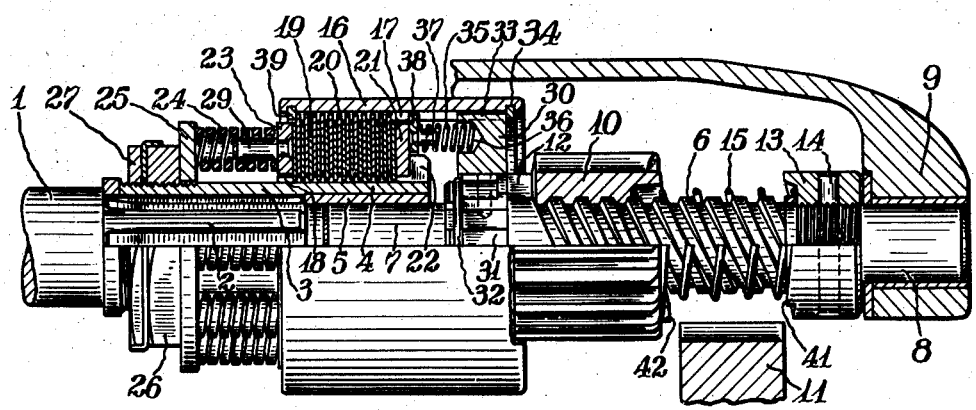
Fig. 1
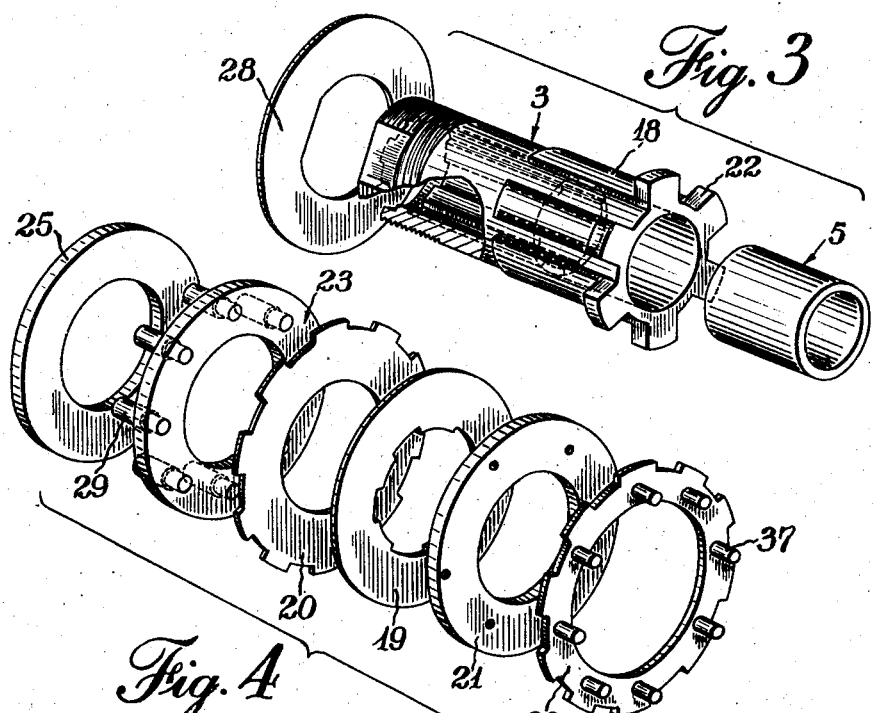
Fig. 3
Fig. 4
Witness:
Burr W. Jones
INVENTOR.
Maurice P. Whitney
BY James E. Buxton
Donald L. Miller
Clinton S. James
ATTORNEY Sept. 3, 1946.  M. P. WHITNEY ET AL  2,407,048
ENGINE STARTER DRIVE
Filed Oct. 27, 1944  2 Sheets-Sheet 2

INVENTOR.
Maurice P. Whitney
BY James E. Buxton
Donald L. Miller
Clinton S. James
ATTORNEY Witness:
Burr W. Jones Patented Sept. 3, 1946

2,407,048

UNITED STATES PATENT OFFICE 2,407,048

ENGINE STARTER DRIVE

Maurice P. Whitney, James E. Buxton, and Donald L. Miller, Chemung County, N. Y., assignors to Bendix Aviation Corporation, South Bend, Ind., a corporation of Delaware Application October 27, 1944, Serial No. 560,604

6 Claims. (Cl. 74—7)

The present invention relates to a heavy duty engine starter drive and more particularly to yielding drive gearing with improved means for controlling the torque capacity of the gearing and for insuring proper meshing and demeshing action thereof.

In heavy duty starters such as are used in large armored vehicles and Diesel-powered boats, special problems arise in connection with meshing and demeshing of the gearing due to the high accelerations and stresses involved, particularly in view of the controlling weight and space limitations. Moreover when a friction clutch is incorporated in the drive to cushion shock loads, the adjustment and stabilization of the clutch also present some difficulties.

It is an object of the present invention to provide a novel heavy duty engine starter strongly and compactly constructed and which is efficient and reliable in operation.

It is another object to provide such a device which incorporates novel means for insuring proper meshing action of the gearing.

It is another object to provide such a device in which a friction clutch is used to limit torque loads and novel means are provided for readily adjusting and fixing the torque capacity of the clutch.

Further objects and advantages will be apparent from the following description taken in connection with the accompanying drawings in which:

Fig. 1 is a side elevation partly in section of a preferred embodiment of the invention showing the parts of the drive in normal or idle position.

Fig. 3 is a detail in perspective of the splined drive sleeve with the bearing bushing and lock washer shown in disassembled relation thereto.

Fig. 4 is a detail in perspective of certain of the parts of the friction clutch and its controlling means shown in disassembled relation.

Figure 2:
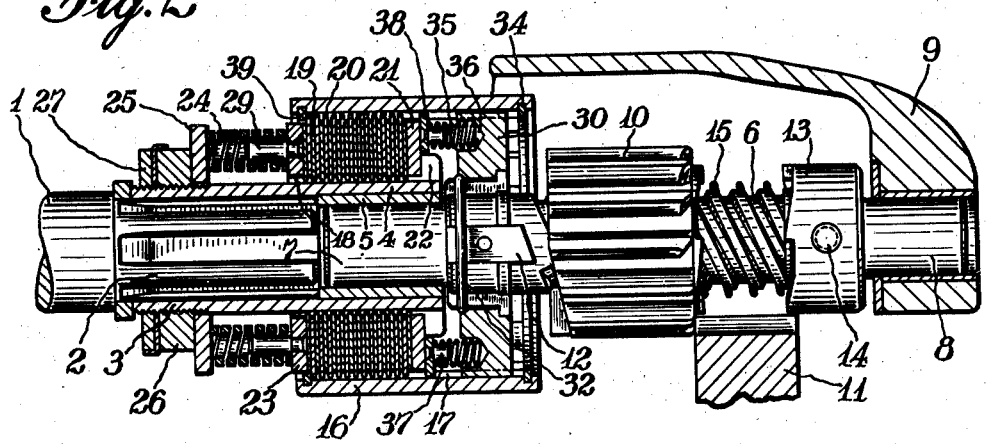
Fig. 2 is a similar view showing the parts in the position assumed in case of tooth abutment between the drive pinion and the engine gear.
Figure 5:
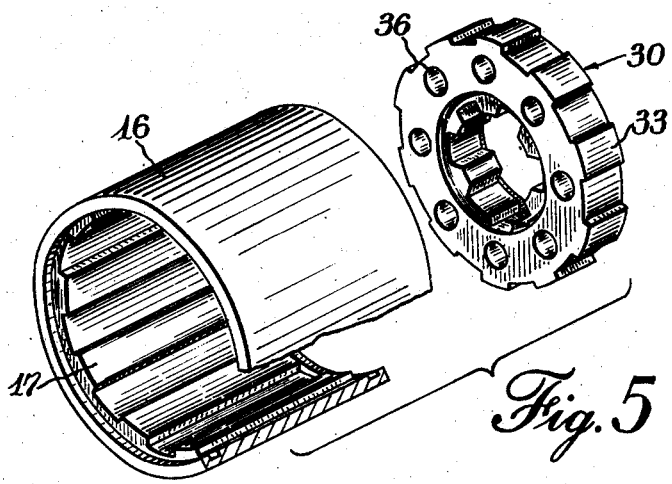
Fig. 5 is a detail in perspective of the splined barrel and coupling member disassembled and partly broken away.
Figure 6:
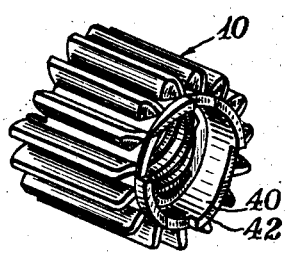
Fig. 6 is a perspective detail of the drive pinion.
Figure 7:
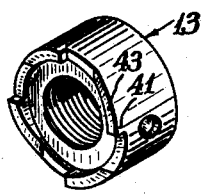
Fig. 7 is a detail in perspective of the stop nut for the drive pinion.

In Fig. 1 of the drawings there is illustrated a drive shaft 1 which may be the extended armature shaft of a starter motor not illustrated. The end of the shaft is provided with splines as indicated at 2 and a correspondingly formed driving sleeve 3 is non-rotatably mounted thereon and projects beyond the end of the shaft. The projecting portion 4 of the sleeve is counterbored to receive a bearing bushing 5 which is pressed therein.

A screw shaft 6 is provided with a smooth bearing portion 7 at one end which fits telescopically within the bearing bushing 5, and is provided at its other end with a second smooth bearing portion 8 which is journalled in an outboard bearing 9 rigidly attached to the frame of the starting motor not illustrated.

A pinion 10 is threaded on the screw shaft 6 for longitudinal movement into and out of engagement with a gear 11 of the engine to be started, the idle position of the pinion being defined by a back-stop 12, and the meshing position being defined by a stop nut 13 fixed as indicated at 14 to the screw shaft. An anti-drift spring 15 is preferably provided for normally maintaining the pinion in idle position against the backstop 12.

A barrel member 16 having internal splines 17 is arranged to surround the adjacent ends of the sleeve 4 and screw shaft 6. The sleeve 4 is provided with external splines 18, and a plurality of friction clutch plates 19 and 20 splined alternately to the sleeve 4 and the barrel 16 are arranged to be pressed into frictional contact to form a driving connection from the sleeve to the barrel. For this purpose a thrust ring 21 is seated adjacent the end of the sleeve against abutment shoulders 22 (Fig. 3) formed thereon, and a pressure ring 23 is loosely mounted in the end of the barrel 16, in position to compress the clutch discs against the thrust ring 21. Yielding means for actuating the pressure ring 23 are provided in the form of an annular series of compression springs 24 which bear at one end against the pressure ring and at the other end on an abutment ring 25 slidably mounted on sleeve 3 and positioned by a nut 26 threaded on the end of the sleeve. The nut 26 is locked in adjusted position by means of a jam nut 27 also threaded on the end of the sleeve 3, with a deformable lock washer 28 interposed between the two nuts and non-rotatably connected to the sleeve as by means of flattened portions as shown clearly in Fig. 3. Pins 29, fixed to the pressure ring 23 extend within the springs 24 and prevent radial or tipping movement thereof.

A coupling member 30 is rigidly keyed on the end of the screw shaft 6 as indicated at 31, being retained thereon by a lock ring 32. The coupling member 30 is provided externally with flutes 33 which engage the internal spline grooves in the barrel 16 so as to form a slidable but non-rotatable connection between the barrel and coupling member. A lock ring 34 is provided for maintaining the coupling member in the barrel.

Means are provided for yieldably passing the coupling member 30 against the lock ring 34 in order to hold the screw shaft 6 in extended relation with respect to the sleeve 3. As here shown this means comprises a plurality of compression springs 35 seated at one end in openings 36 in the coupling member and at the other ends embracing a series of pins 37 fixed to a backing ring 38 which is also splined within the barrel 16. The ring 38 bears against the thrust ring 21 for the clutch plates 19, 20; and the latter are retained in the barrel by a lock ring 39 whereby the springs 35 are maintained under initial compression. The fact that the coupling member 30 and the ring 38 are both splined in the interior of the barrel 16, effectively prevents the springs 35 which are anchored at either end to said members respectively, from tipping over or becoming distorted.

The abutting ends of the pinion 10 and stop-nut 13 are preferably formed with inclined abutments 40 and 41 respectively, the engaging surfaces 42, 43 of which are at sufficiently high angles to the axis of the drive as illustrated to prevent the pinion from sticking in mesh. This structure is more completely illustrated and described in the application of Christian, Serial Number 527,851, filed March 23, 1944.

In operation, starting with the parts in the positions illustrated in Fig. 1, rotation of the power shaft 1 by the starting motor is transmitted through the sleeve 3, the clutch discs 19, 20, barrel 16, and coupling member 30 to the screw shaft 6, whereupon the pinion 10 is traversed into mesh with the engine gear 11 until it engages the stop-nut 13. The torque of the starting motor is then applied to crank the engine, the shock of initial engagement being cushioned by the slipping of the clutch discs 19, 20. When the engine starts, the acceleration of the engine gear 11 returns the pinion 10 to idle position against the back stop 12.

If, during the meshing movement of the pinion 10, tooth abutment should occur between the teeth of the pinion and the engine gear as shown in Fig. 2, the screw shaft 6 is caused to move to the left against the pressure of the mesh-enforcing springs 35 until the friction in the screw threads of the pinion and screw shaft builds up sufficiently to rotate the pinion so as to index its teeth into proper registry with the tooth spaces of the engine gear. When this occurs, the expansion of the springs 35 snaps the pinion into initial mesh with the engine gear after which meshing and cranking occur in the usual manner.

It will be understood that the clutch pack is adjusted to transmit sufficient torque to perform the cranking operation but to slip and thereby protect the drive from overloads. In so adjusting the clutch, the drive sleeve 3 is held stationary in a suitable fixture and the screw shaft is rotated by power while the nut 26 is tightened until the torque transmitted through the clutch, as measured by any suitable metering means, registers the desired number of pounds-feet. The jam nut 27 is then tightened up against the lock washer 28, and the periphery of the lock washer hammered down on flats of the two nuts as shown in Figs. 1 and 2 whereupon the adjustment is locked.

Although but one form of the invention has been shown and described in detail, it will be understood that other forms are possible and various changes may be made in the design and arrangement of the parts without departing from the spirit of the invention as defined in the claims appended hereto.

What is claimed is:

1. In an engine starter drive a power shaft, an externally splined sleeve fixed thereon, a screw shaft slidably journalled at one end in the sleeve, a pinion threaded on the screw shaft for longitudinal movement into and out of mesh with a gear of an engine to be started, a stop nut fixed on the screw shaft defining the operative position of the pinion, a coupling member fixed on the screw shaft and means for frictionally connecting the coupling member to rotate with the sleeve including a barrel member splined on the coupling member, a plurality of clutch plates splined alternately to the sleeve and barrel, said sleeve having a fixed abutment at one end, a pair of nuts adjustably threaded on the opposite end of the sleeve a deformable washer between the nuts slidably but non-rotatably mounted on the sleeve, and spring means between said nuts and clutch plates for compressing the clutch plates against said abutment.

2. In an engine starter, a drive shaft, a barrel member, means including a friction clutch for connecting the barrel to the shaft, a screw shaft, a pinion threaded thereon for longitudinal movement into and out of engagement with a gear of an engine to be started, a coupling member fixed to the screw shaft and splined to the barrel, a backing ring non-rotatably connected to the barrel and a plurality of compression springs between the coupling member and backing ring.

3. An engine starter as set forth in claim 2 including further stop means in the barrel for holding the coupling member therein, said springs being arranged to yield when, in the meshing movement of the pinion, a tooth of the pinion abuts against a tooth of the engine gear, until the friction in the screw threads builds up sufficiently to index the pinion into proper registry with the tooth spaces of the engine gear whereupon they expand to snap the pinion into initial mesh by moving the coupling member along its splined connection in the barrel into engagement with the stop means.

4. In an engine starter a drive shaft, a screw shaft, a sleeve fixed to the drive shaft and having a telescopic connection with one end of the screw shaft, a bearing for the other end of the screw shaft, an abutment on the screw shaft adjacent the bearing, a pinion threaded on the screw shaft for movement into and out of mesh with a gear of an engine to be started, a yielding driving connection between the sleeve and screw shaft including a barrel member and a coupling member splined therein and fixed to the screw shaft, a backing ring non-rotatably mounted in the barrel and a plurality of compression springs between the coupling member and backing ring.

5. An engine starter as set forth in claim 4 in which the pinion moves toward said bearing when going into mesh with the engine gear, and the screw shaft is so mounted in the bearing as to be slidable therein in the opposite direction against the force of said springs.

6. An engine starter as set forth in claim 4 in which the ends of the compression springs are so connected to the coupling member and thrust plate that said member and plate serve to keep the springs always in parallel relation to the axis of said screw shaft.

MAURICE P. WHITNEY.
JAMES E. BUXTON.
DONALD L. MILLER.